United States Patent [19]

Morikawa

[11] Patent Number: 5,181,068
[45] Date of Patent: Jan. 19, 1993

[54] METHOD FOR DETERMINING AMOUNTS OF UCR AND IMAGE PROCESSING APPARATUS

[75] Inventor: Seiichiro Morikawa, Kaisei, Japan
[73] Assignee: Fuji Photo Film Co., Ltd., Kanagawa, Japan
[21] Appl. No.: 825,492
[22] Filed: Jan. 24, 1992
[30] Foreign Application Priority Data Jan. 30, 1991 [JP] Japan .................................... 3-9554

[51] Int. Cl.⁵ ............................................ G03B 27/32
[52] U.S. Cl. ..................................... 355/77; 355/327; 358/79; 358/443; 358/456
[58] Field of Search .................. 354/297, 298; 355/38, 355/77, 327; 358/76, 79, 80, 400, 443, 455, 456, 448

[56] References Cited

U.S. PATENT DOCUMENTS 5,084,762 1/1992 Miyakawa ............................ 358/79

Primary Examiner—Michael L. Gellner
Assistant Examiner—D. Rutledge
Attorney, Agent, or Firm—Sughrue, Mion, Zinn, Macpeak & Seas

[57] ABSTRACT

UCR (under color removal) amount is determined, which can satisfy printing conditions as desired easily and within short time. Gray balance for Y, M and C is inputted from input means 13. A control means 9 interpolates the inputted gray balance as necessary and instructs a test pattern generator 12 and an output unit 7 to output a test pattern so that matrix is formed by Y, M, C and K. Based on the outputted test pattern, a print plate is prepared, and a sample of matrix is prepared by 4-plate overlapping printing. Each density of matrix is measured, and said measured density value is inputted from the input means 13. The control unit 9 incorporates each density and calculates the amount of UCR, which satisfies the input gray balance from interrelation of the density of Y, M, C and K of the matrix.

14 Claims, 12 Drawing Sheets

FIG. 7A

| GBALY0 | GBALY1 | GBALY2 | GBALY3 | GBALY4 | GBALY5 | GBALY6 | GBALY7 | GBALY8 | GBALY9 |

FIG. 7B

| GBALM0 | GBALM1 | GBALM2 | GBALM3 | GBALM4 | GBALM5 | GBALM6 | GBALM7 | GBALM8 | GBALM9 |

FIG. 7C

| GBALC0 | GBALC1 | GBALC2 | GBALC3 | GBALC4 | GBALC5 | GBALC6 | GBALC7 | GBALC8 | GBALC9 |

FIG. 7D

| GBALK0 | GBALK1 | GBALK2 | GBALK3 | GBALK4 | GBALK5 | GBALK6 | GBALK7 | GBALK8 | GBALK9 |

FIG. 9A

| LY0 |
|---|
| LY1 |
| LY2 |
| LY3 |
| LY4 |
| LY5 |
| LY6 |
| LY7 |

FIG. 9B

| LM0 |
|---|
| LM1 |
| LM2 |
| LM3 |
| LM4 |
| LM5 |
| LM6 |
| LM7 |

FIG. 9C

| LC0 |
|---|
| LC1 |
| LC2 |
| LC3 |
| LC4 |
| LC5 |
| LC6 |
| LC7 |

FIG. 9D

| SK0 | SK1 | SK2 | SK3 | SK4 | SK5 | SK6 |
|---|---|---|---|---|---|---|

FIG. 10

|   | K0 | K1 | K2 | K3 | K4 | K5 | K6 |
|---|---|---|---|---|---|---|---|
| 0 | (0,0) | (1,0) | (2,0) | (3,0) | (4,0) | (5,0) | (6,0) |
| 1 | (0,1) | (1,1) | (2,1) | (3,1) | (4,1) | (5,1) | (6,1) |
| 2 | (0,2) | (1,2) | (2,2) | (3,2) | (4,2) | (5,2) | (6,2) |
| 3 | (0,3) | (1,3) | (2,3) | (3,3) | (4,3) | (5,3) | (6,3) |
| 4 | (0,4) | (1,4) | (2,4) | (3,4) | (4,4) | (5,4) | (6,4) |
| 5 | (0,5) | (1,5) | (2,5) | (3,5) | (4,5) | (5,5) | (6,5) |
| 6 | (0,6) | (1,6) | (2,6) | (3,6) | (4,6) | (5,6) | (6,6) |
| 7 | (0,7) | (1,7) | (2,7) | (3,7) | (4,7) | (5,7) | (6,7) |

4-color overlapping density (Y+M+C+K)

METHOD FOR DETERMINING AMOUNTS OF UCR AND IMAGE PROCESSING APPARATUS

BACKGROUND OF THE INVENTION

1. Field of the Invention

The present invention relates to a method for determining amounts of UCR (under color removal) to be used for converting a 3-color signal of yellow (Y), magenta (M) and cyan (C) to a 4-color signal of Y, M, C and black (K) (3/4 conversion), and also to an image processing apparatus using said method for determining UCR amounts.

2. Description of the Related Art

In an image processing apparatus for preparing dot film for printing, a 3-color signal separated by a scanner into red (R), green (G) and blue (B) is converted into the 3 colors Y, M and C and these 3 colors are further converted into the 4 colors Y, M, C and K. This is called UCR (under color removal) processing. In UCR processing, the density data for K is prepared from density data the inputted 3 colors of Y, M and C, and a UCR amount is subtracted from the density data the inputted 3 colors of Y, M, and C.

UCR is not the same value for Y, M or C, and it is expressed as a function of the density of generated K and inputted density of Y, M and C for each color. For example, if it is supposed that the density of the generated K is $d_K$ and the density of the inputted C is $d_C$, UCR relative to C is expressed as a function of $d_K$ and $d_C$: $g(d_C, d_K)$. For Y and M, it is expressed similarly as a function of the density of K respectively.

The amount of UCR is experimentally obtained and it is set as a fixed value in an image processing apparatus. However, users often want to determine the UCR amount according to the desired printing conditions, and a conventional image processing apparatus cannot satisfy such requirements. For this reason, if a user wants to express UCR characteristics as desired in a conventional image processing apparatus, it is necessary to finely adjust parameters for gradation adjustment and halftone percentage and to totally adjust input/output characteristics of density data by repeated trial and error. This requires tremendous labor and time until satisfactory settings can be reached, and the working efficiency is very low.

SUMMARY OF THE INVENTION

It is an object of the present invention to provide a method for determining the amount of UCR to easily set UCR rates as desired, and also to provide an image processing apparatus using said method for determining the UCR amount.

To attain the above object, the method for determining UCR amount according to the present invention is characterized in that a test pattern is printed according to the gray balance set by a predetermined step and the density of a matrix of a desired size obtained by said test pattern is measured, and the UCR amount is determined according to said measured density. The image processing apparatus according to the present invention comprises input means, output means and control means, where the output means outputs a test pattern according to gray balance set by said input means, and said control means determines the UCR amount based on measured density of a matrix obtained by printing said test pattern inputted from said input means.

First, gray balance of Y, M and C is inputted. Next, the inputted gray balance is interpolated as necessary, and a test pattern is generated so that Y, M, C and K form a matrix. Form this test pattern, a printing sample of 4 plates is prepared, and each density thus read is incorporated. Further, from the interrelation of the matrix density, the UCR amount corresponding to the printing conditions for preparing the sample is obtained.

The above and other objects, features and advantages of the present invention will become apparent from the following description and the appended claims, taken in conjunction with the accompanying drawings, in which a preferred embodiment of the present invention is shown by way of illustrative example.

BRIEF DESCRIPTION OF THE DRAWINGS

FIG. 7A-7D shows examples of outputted test patterns;

FIG. 9A-9D are examples of test patterns for 3/4 conversion;

FIG. 10 shows a matrix obtained when the test pattern for 3/4 conversion is printed;

DETAILED DESCRIPTION OF THE PREFERRED EMBODIMENT

Figure 1:
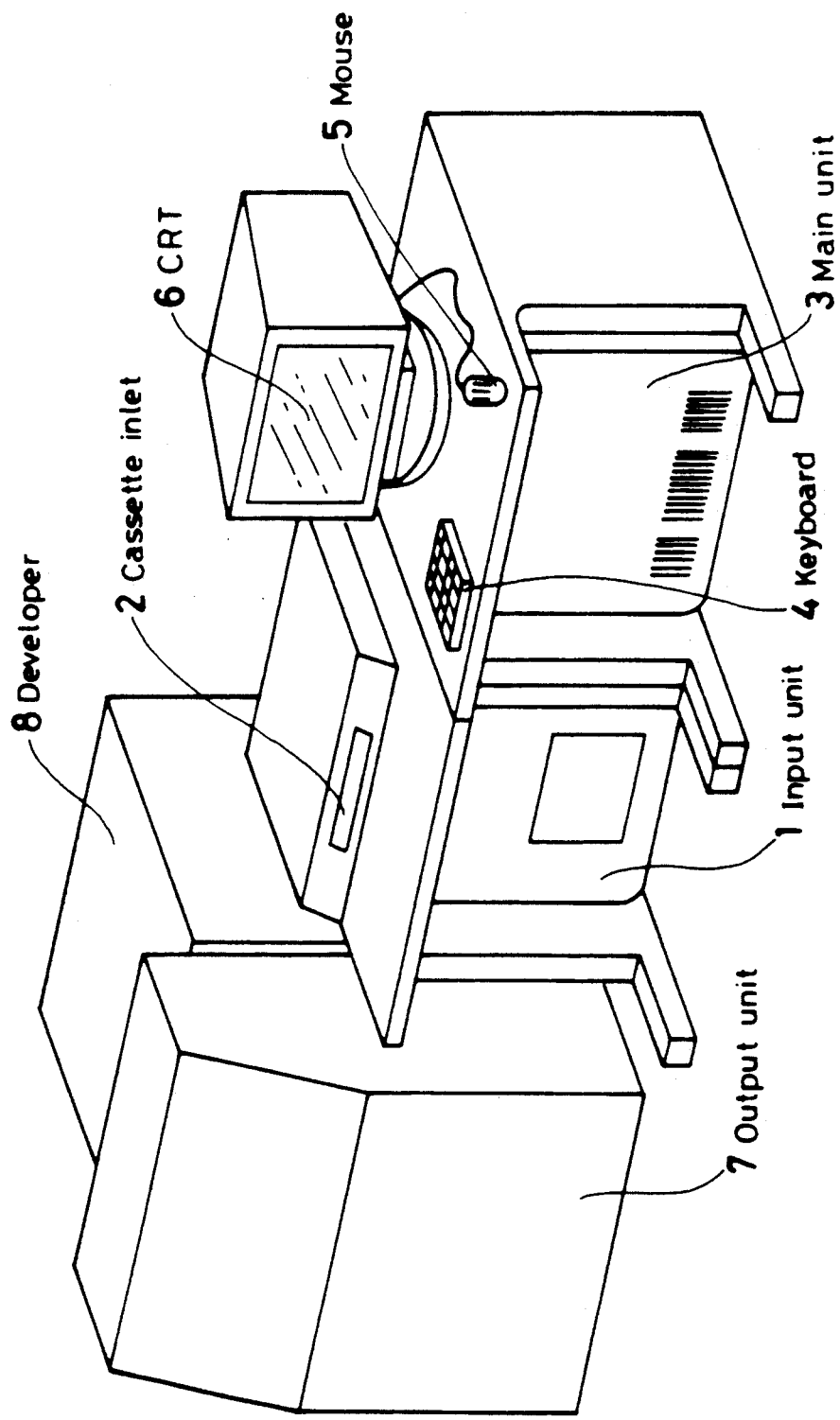
FIG. 1 is an external view of an embodiment of an image processing apparatus according to the present invention.

FIG. 1 is an external vie of an embodiment of the image processing apparatus of the present invention, in which the reference numeral 1 designates an input unit, 2 a cassette inlet, 3 a main unit, 4 a keyboard, 5 a mouse, 6 a CRT, 7 an output unit, and 8 a developer.

The input unit 1 consists of a plane scanner, and a cassette containing a manuscript for color separation is set into the input unit 1 from a cassette inlet 2.

In the main unit 3, there are provided a control unit comprising microprocessors for controlling operation of each component of said image processing apparatus, and further various circuits such as an image processing unit, a test pattern generator, etc.

The keyboard 4 and the mouse 5 are furnished as input means and are used to select a desired menu on a display screen of CRT 6 as a display unit or to input a desired parameter.

The output unit 7 depicts the image of the manuscript on a film for each color of Y, M, C and K. The film with the depicted image is developed by a developer 8 and is outputted, and a printing plate is prepared according to the developed image.

Figure 2:
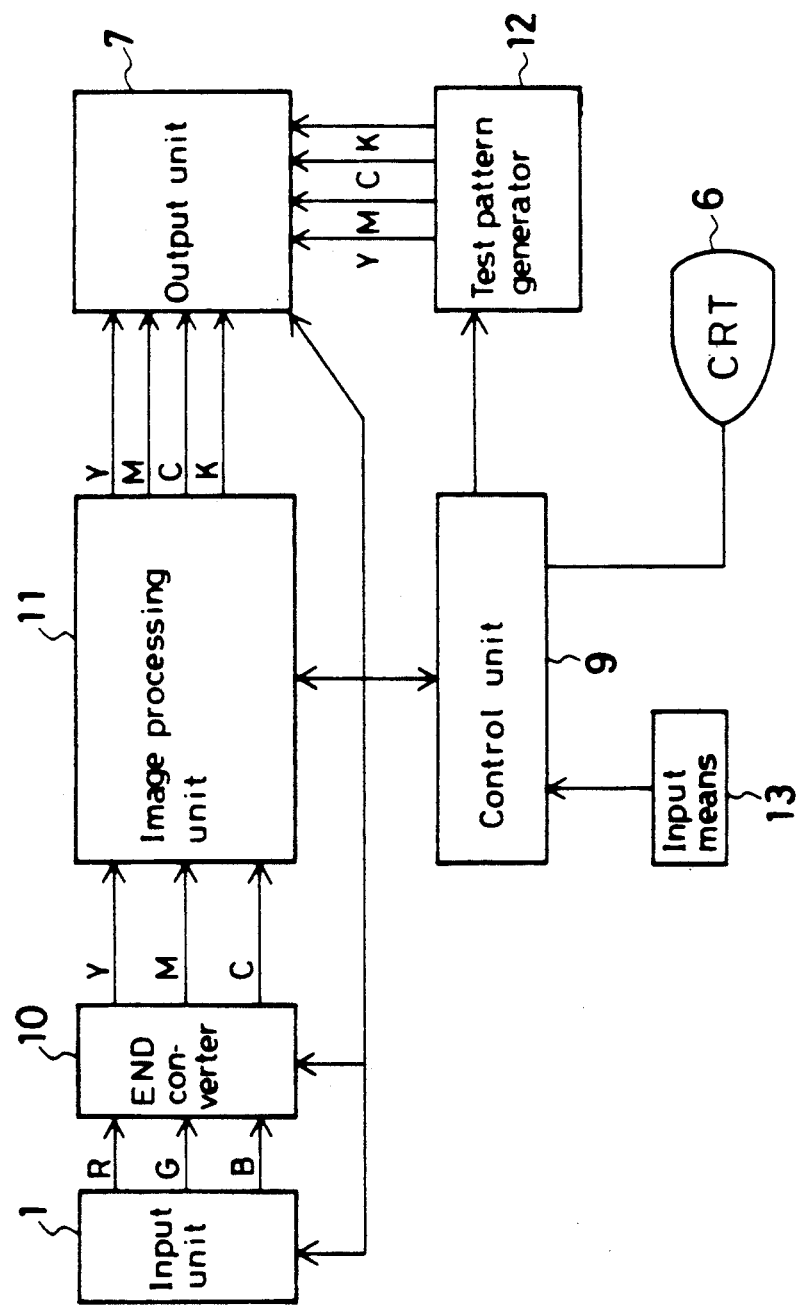
FIG. 2 is a block diagram showing the electrical arrangement and signal flow of the image processing apparatus of FIG. 1.

FIG. 2 is a schematical block diagram showing the electrical arrangement and signal flow of the entire image processing apparatus shown in FIG. 1. Density data for the 3 colors R, G and B obtained through color separation of the image on the manuscript by the input unit 1 is converted to density data of Y, M and C by an END converter 10 and is inputted to an image processing unit 11. In the image processing unit 11, desired processing such as color correction, gradation conversion, etc. are performed, and density data for 4 colors Y, M, C and K is generated in a UCR processing unit. Further, the density data of these 4 colors are converted to a quantum level (hereinafter referred as ("QL"). Thus, QL is inputted to the output unit 7.

The purpose of test pattern generator 12 is to send image data of the desired test pattern to the output unit 7 in order to output a dot percentage indicated by the control unit 9.

Based on menus and parameters from the input means, which comprises a keyboard 4 and a mouse 5, the control unit 9 controls the operation of the input unit 1, the END converter 10, the image processing unit 11, the output unit 7, and the test pattern generator 12 for the desired processing. It also controls the screen display on CRT 6.

Figure 3:
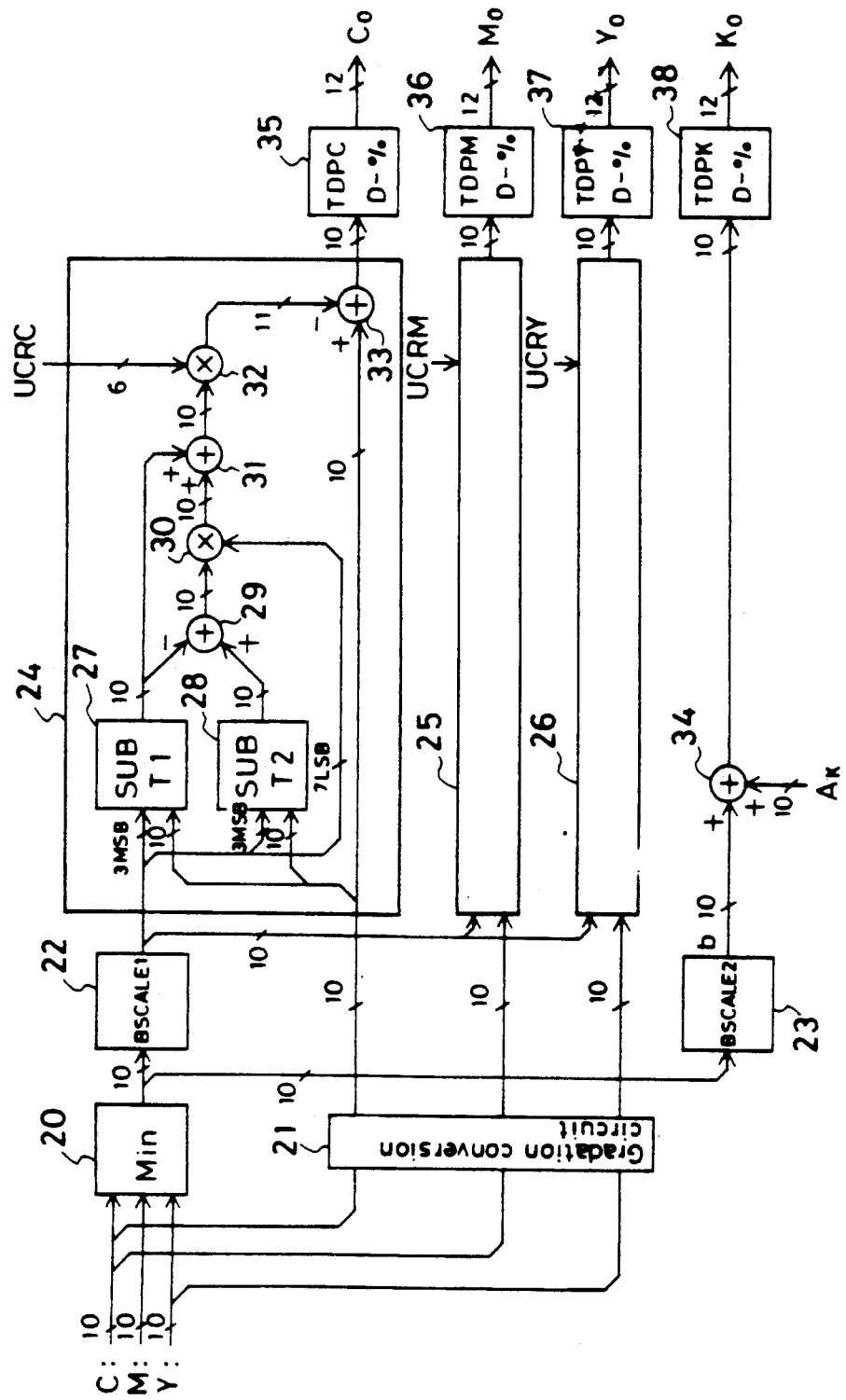
FIG. 3 is a diagram showing the detail of the image processing apparatus.

FIG. 3 is an arrangement example of the image processing unit 11. In FIG. 3, density data for Y, M and C is expressed by 10 bits. FIG. 3 shows that part where the main feature of the present invention. It is obvious to those skilled in art that color correction circuits and the like (not shown) can be provided when necessary.

In FIG. 3, input density data $C_i$, $M_i$ and $Y_i$ are inputted into a minimum value selection circuit (Min) 20. The minimum value among $C_i$, $M_i$ and $Y_i$, i.e. the gray component in printing, is selected and is inputted to BSCALE1 and BSCALE2. The input density data $C_i$ is inputted to a gradation conversion circuit 21 and is inputted to a cyan UCR processing circuit after gradation conversion as desired. Similarly, the input density data $M_i$ and $Y_i$ are inputted to the gradation conversion circuit 21 and to a magenta UCR processing circuit 25 and a yellow UCR processing circuit 26 respectively after gradation conversion as desired.

Figure 4:
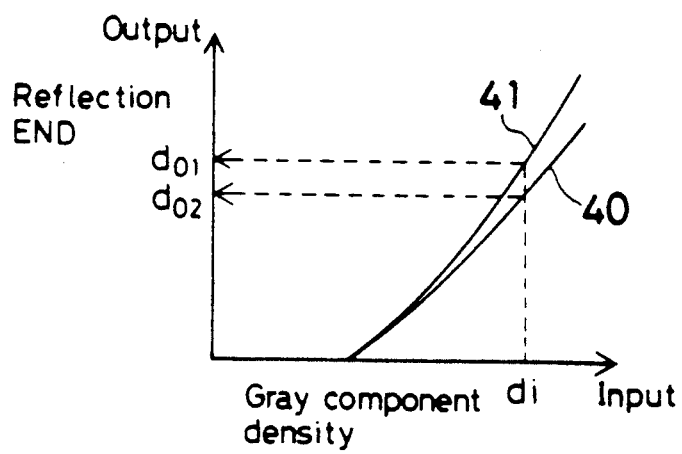
FIG. 4 is a diagram showing an example of using an LUT (look-up table) to obtain a K plate substitution value.

BSCALE1 and BSCALE2 generate substitution values (reflection END) which are to be substituted by K plate with respect to the inputted gray component, and each of them comprises a look-up table (hereinafter referred as a "LUT"). It is not that the inputted gray component is used as reflection END, but that a part of the gray component is used as reflection END, and BSCALE1 is a LUT having characteristics as shown by 40 in FIG. 4. BSCALE2 outputs a K plate value to be reproduced in printing with respect to the inputted gray component. If it has the same input/output characteristics as BSCALE1, a printing output corresponding to $C_i$, $M_i$ and $Y_i$ is obtained by $C_0$, $M_0$, $Y_0$ and $K_0$ respectively because the K plate substitution value agrees with the K plate reproduction value. If it has input/output characteristics as shown by 41 in FIG. 4, it is possible to control the K plate reproduction value independently from the K plate substitution value.

The 10-bit reflection END outputted from BSCALE1 and 10-bit C density data after gradation conversion in the gradation conversion circuit 21 are inputted to the cyan UCR processing circuit 24. If it is supposed that the K plate substitution value outputted from BSCALE1 is $d_K$ and cyan density to be reproduced is $d_4$, density $d_3$ of C plate, which is turned to reproduction END when the K plate substitution value is overlapped in printing the object, is given as follows:

$$d_3 = d_4 - k \times g(d_4, d_K) \quad (1).$$

where k is a coefficient. The function value of g ($d_4$, $d_K$) can be reproduced by a 20-bit address table because both $d_4$ and $d_K$ are 10 bits respectively. To provide such table, a memory of enormous capacity is required. For this reason, in the arrangement of FIG. 3, a table representing the K plate substitution value by the upper level 3 bits of $d_K$ is used as a reference and linear interpolation is performed using the lower level 7 bits. Specifically, in FIG. 3, SUBT1 and SUBT2 are constituted by the same LUT to determine a UCR amount with respect to $d_4$. Using two LUTs, the upper level 3 bits of $d_K$ are inputted to SUBT1 and SUBT2 as the K plate substitution value, and the lower level 7 bits are inputted to a multiplier 30 for linear interpolation.

Figure 5:
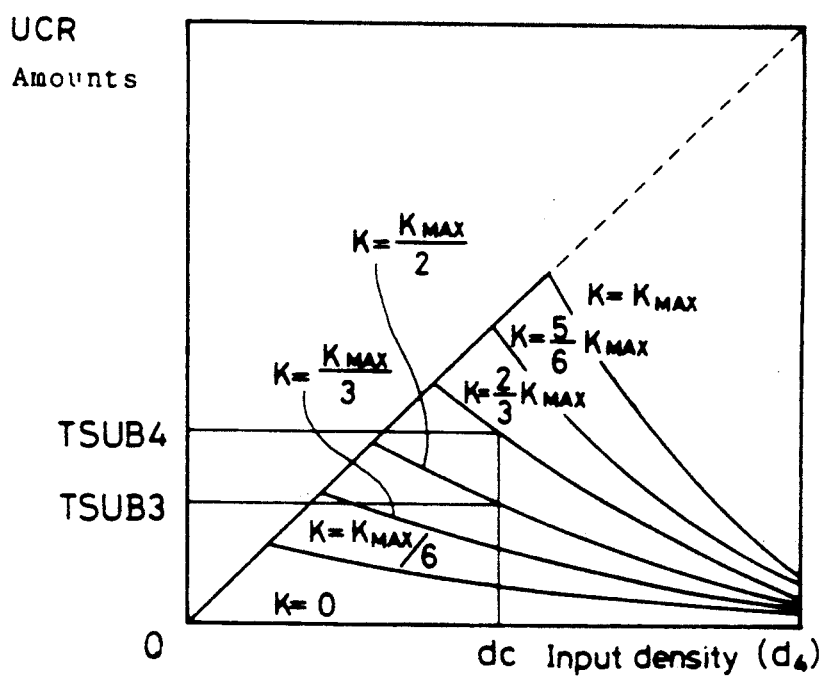
FIG. 5 is a diagram showing an example of using an LUT to obtain a UCR amount.

As shown in FIG. 5, 7 characteristic curves determining UCR amount with respect to $d_4$ are described in SUBT1 and SUBT2 when the density of K is 0, $K_{MAX}/6$, $2K_{MAX}/6$, $3K_{MAX}/6$, $4K_{MAX}/6$, $5K_{MAX}/6$ and $K_{MAX}$. ($K_{MAX}$ is a printing density when K plate dot percentage is 100.) When the value of the upper level 3 bits is m ($0 \leq m < 7$), a value characteristic curve of $m \times K_{MAX}/6$ is read from SUBT1, and a value of characteristic curve $(m+1) \times K_{MAX}/6$ is read at the same address from SUBT2. The output of SUBT1 is subtracted from the output of SUBT2 in an adder 29, and the output of the adder 29 is multiplied by a value of the lower level 7 bits in the multiplier 30. Further, the output of SUBT1 is added to the output of the multiplier 30 by the adder 31. As the result, SUBT1 and SUBT2 are provided with 7 characteristic curves as given in FIG. 5, and the necessary function value can be obtained by linear interpolation of these characteristic curves.

More concretely, the operation proceeds as follows: If it is supposed that density of inputted C is $d_c$, an output value $d_{01}$ at $d_i = d_c$ is obtained by referring to curve 40. For easier understanding, the 10-bit output density is divided into the upper level 3 bits and lower level 7 bits, and if it is assumed that the upper level 3 bits are integral and the lower level 7 bits are decimal and that $d_{01}$ is $3 + t$ ($0 \leq t < 1$), the UCR amount (TSUB3) when $d_4$ is $d_c$ in the characteristic curve of $K = 3K_{MAX}/6 = K_{MAX}/2$ is outputted from SUBT1 as shown in FIG. 5, and the UCR amount (TSUB4) when $d_4$ is $d_c$ in the characteristic curve of $K = 4K_{MAX}/6 = 2 - K_{MAX}/3$ is outputted from SUBT2. Therefore, the output of the adder 31 is:

$$(TSUB4 - TSUB3) \times t + TSUB3 \\ \times TSUB3 \times (1-t) + TSUB4 \times t \quad (2).$$

and it is apparent that linear interpolation is performed between the two characteristic curves.

The UCR amount thus obtained is multiplied by a predetermined UCR adjustment value UCRC supplied from the control unit 9 in the multiplier 32 to obtain a final UCR amount. This is subtracted from C density inputted in the adder 33, and C plate density $d_3$ is generated, which is a reproduction density when the K plate substitution value is placed on a print. Here, UCR adjustment value UCRC corresponds to the coefficient k in equation (1) above. The same applies to M and Y.

To the K plate reproduction density generated in BSCALE2, $A_K$ is added by an adder 34 in order to control the K plate value according to input hue. For example, $A_K$ can be supplied from a color correction circuit (not shown), but description is not given here in detail because it is not an essential part of the present invention.

C, M and Y after UCR processing and K, i.e. the output of the adder 34, are inputted to TDPC35, TDPM36, TDPY37 and TDPK38 comprising LUTs, respectively, and density values are converted to dot percentage values to be outputted to film. Density values of C, M, Y and K inputted to TDPC35, TDPM36, TDPY37 and TDPK38 are 10 bit values while the output is 12 bits to obtain high resolution. The output signal is inputted to a circuit (not shown in FIG. 3) to convert from dot percentage to QL, and output of this circuit is sent to the output unit 7.

By the above procedure, halftone film in 4 colors C, M, Y and K can be obtained as a basis for a print plate.

Next, description is given of the operation of each component unit in FIG. 2 and of user manipulation with respect to the method for determining UCR amounts according to the present invention.

Figure 6A:
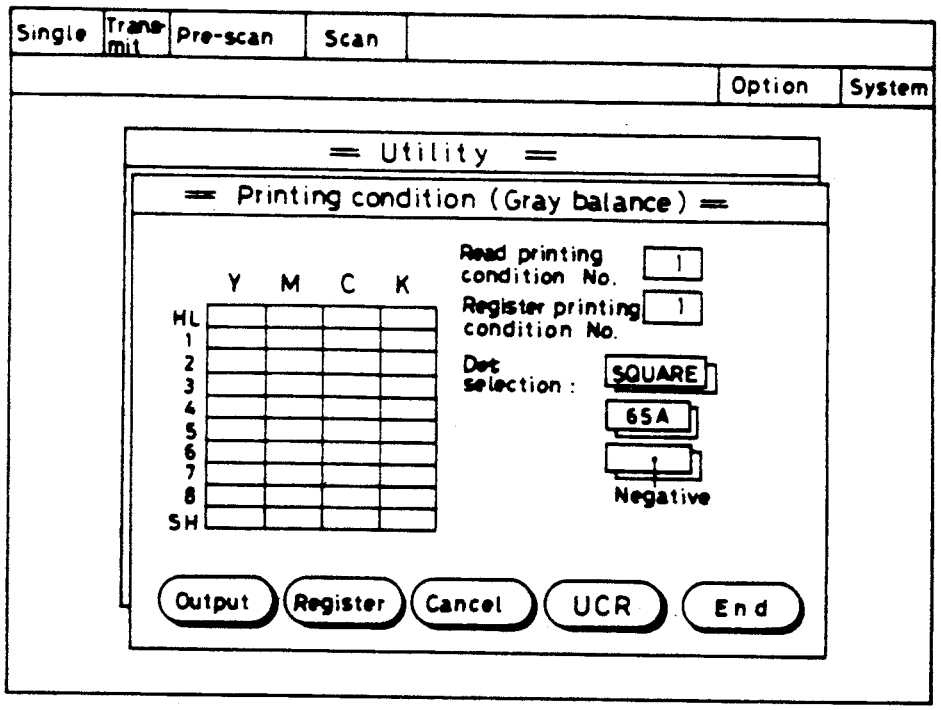
FIGS. 6A, 6B shows examples of screens displayed on a CRT.
Figure 6B:
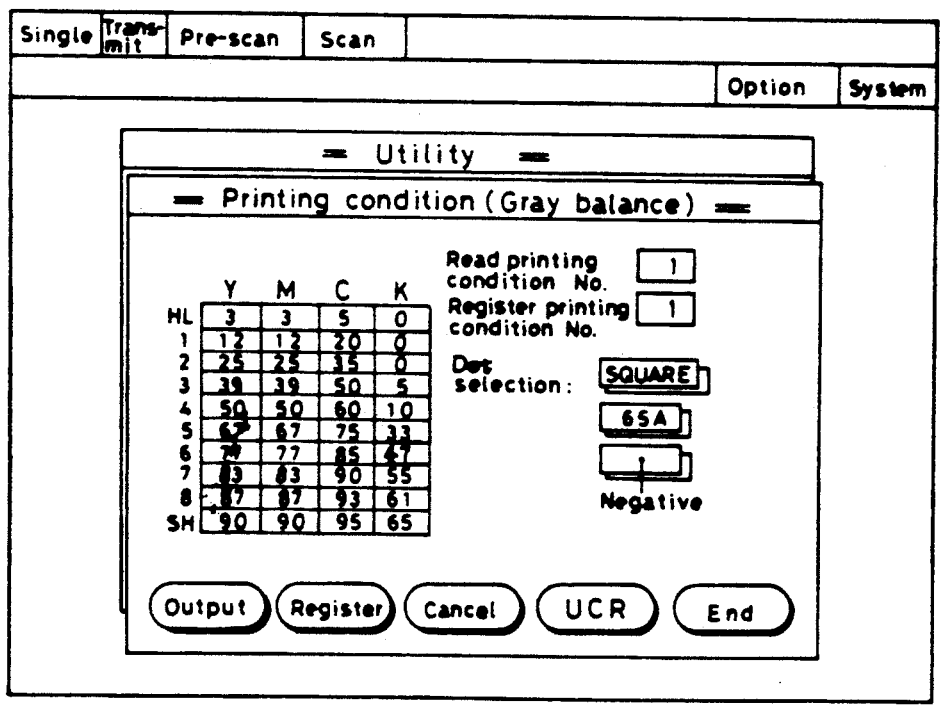

In FIG. 1 and FIG. 2, a utility menu is selected from screen displayed on CRT 6. Further, when a menu for a printing condition is selected on the utility screen, a screen shown in FIG. 6A is displayed. Then, a user sets desired gray balance using dot percentage values for 10 points including a highlight (HL) point, a shadow (SH) point and 8 arbitrary intermediate points for Y, M, C and K respectively, and the user also inputs the type of dot the number of lines and whether film output is carried out in positive or negative. FIG. 6B shows an example of the setting of these parameters. In FIG. 6B, SQUARE is selected as the type of screen. The number of lines is set to 65 (LPI), and film output is set to negative.

When a "registration" menu is selected by a mouse 5 on the screen of FIG. 6B after all parameters have been set, the input parameters are registered by the control unit 9. When the "output" menu is selected on the screen of FIG. 6B, the control unit 9 forwards the dot percentage value of each input color to a test pattern generator 12 and instructs the output unit 7 to input image data from the test pattern generator 12 on film. As a result, test patterns given in FIGS. 7A to D are outputted. By preparing a print plate according to the test pattern and by printing it, it is possible to confirm whether gray can be attained by the input dot percentage or not. In FIG. 7A, GBALY0 designates a dot percentage value of Y at the HL point, GBALY9 is a dot percentage value of Y at the SH point, and GBALY 1 to 8 are dot percentage values of Y at the 8 intermediate points respectively. The same applies to M, C and K.

When registration is completed after the printing conditions are set as described above, "UCR" is selected on the screen of FIG. 6B. Then, the control unit 9 displays a screen of FIG. 8 on CRT 6. When the "output" menu is given on the screen, the control unit 9 instructs generation of a test pattern for 3/4 conversion to the test pattern generator 12. FIG. 9 shows examples of the test patterns for 3/4 conversion. FIGS. 9A, B, C and D designate respectively a test pattern for Y plate, a test pattern for M plate, a test pattern for C plate, and a test pattern for K plate. The test patterns for Y plate, M plate and C plate are patterns of lateral stripes having 8-step dot percentages respectively, and the test pattern for K plate is a longitudinal stripe pattern having a 7-step dot percentage. The relationship between dot percentage value of each step for each color and dot percentage value of the 10 points for each color is as follows:

First, for the test pattern for K plate, dot percentage values of 0, 27, 54, 74, 87, 95 and 100 are given from $SK_0$ to $SK_6$ regardless of the input dot percentage. The above numerical values were obtained experimentally to obtain approximately equally divided density gradations.

For each dot percentage of the test pattern for C plate, the dot percentage value at the shadow point is obtained by GBALC9, i.e. by the following equation:

$$LC_i = 32 \times GBALC9 \times i/7 + 448 \quad (3)$$

(i=0 to 7)

In the equation (3), coefficients 32 and 448 are constants applied when the dot percentage value is expressed by 12 bits. The same applies to the constants hereinafter.

For each dot percentage of the test pattern for Y plate, the combination:

$$(x_i, y_i) = (GBALCi, GBALYi) \quad (i=0 \text{ to } 9)$$

is conceived. An interpolation function from x to y is obtained, and it is expressed by $y = f_y(x)$. $LY_i$ is given by the following equation:

$$LY_i = 32 \times f_y(LC_i) + 448 \quad (4)$$

(i=0 to 7)

Each dot percentage of the test pattern for M plate is obtained by the following equation from a function equation $y' f_M(x)$ given by interpolation from $(x_i, y_i) = (GBALC_i, GBALM_i)$ by the same procedure:

$$LM_i = 32 \times f_M(LC_i) + 448 \quad (5)$$

(i=0 to 7)

Each of the function equations can be obtained from the combination of $(x_i, y_i)$ by a method such as quasi-Hermitian interpolation.

As described above, 10 points are inputted from HL to SH for Y, M and C with respect to gray balance, while 8 steps are used in the test pattern for 3/4 conversion. The reason is as follows: It is also possible to have the test pattern for 3/4 conversion in 10 steps. In this case, there is no need to perform complicated conversion as described above, and the test pattern can be prepared by using dot percentage values as inputted. But, the number of density measuring points are increased and the procedure is more complicated as described below. In contrast, it is possible to input 8 points from HL to SH for gray balance. In this case, the test pattern can be prepared by using dot percentage values as inputted, but it is desirable that there are more points for gray balance. This is why 10 points are inputted from HL to SH for gray balance, and the dot percentage values inputted are converted to 8 steps.

The control unit 9 converts the dot percentage inputted in FIG. 6B to 8 steps by the above procedure and gives it to the test pattern generator 12. As the result, the test patterns for 3/4 conversion given in FIGS. 9A, B, C and D are outputted from the output unit 7.

Next, printing is performed using the test pattern for 3/4 conversion. Then, the gray matrix as given in FIG. 10 is obtained. In FIG. 10, (i, j) (i=0 to 6, j=0 to 7) designate addressing of the matrix.

Figure 8:
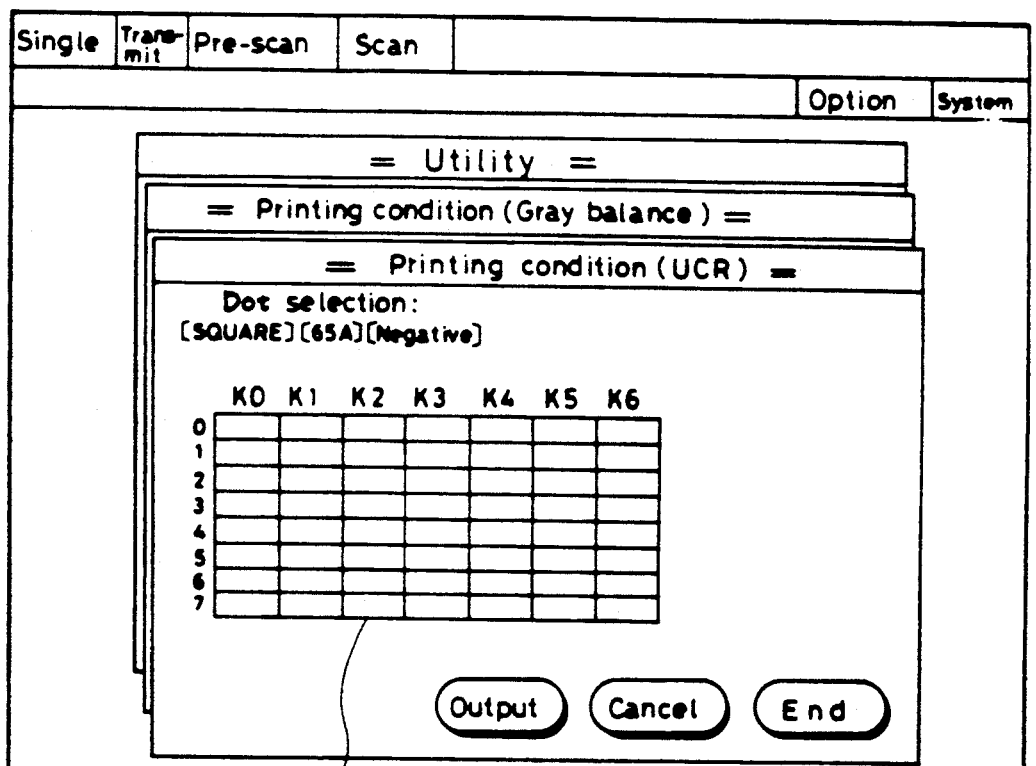
FIG. 8 is an example of a screen when measured density value is inputted.

Then, the density of each address of the matrix is measured, and the values read on a densitometer are inputted to the address corresponding the address of the matrix 42 in FIG. 8 by a keyboard 13, in the form (DSK (i, j)).

When the "end" menu is selected after the density values for all addresses have been inputted, the control unit 9 incorporates the input density values and registers them. Also, the processing to obtain the LUTs to be set to BSCALE1, SUBT1, SUBT2, TDPC35, TDPM36, TDPY37, and TDPK38 is started, as explained in detail below.

Figure 11A:
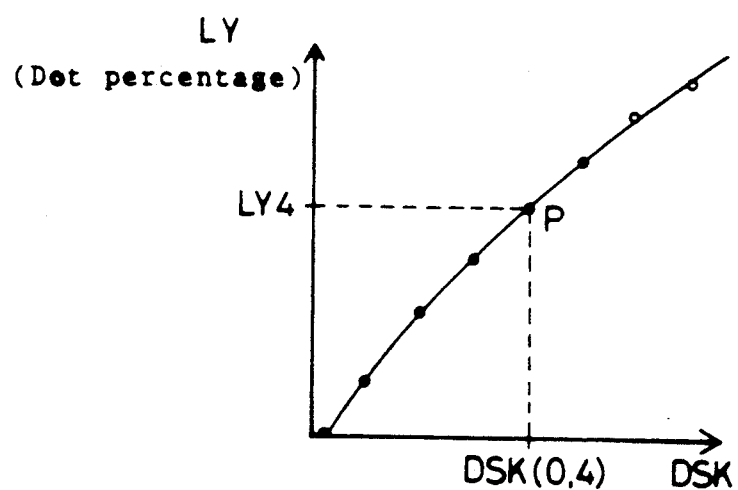
FIGS. 11A, 11B are diagrams for explaining preparation and processing of a table to indicate the relationship between density and dot percentage.

The control unit 9 incorporates the density of column K0 of the input measured density matrix and plots the dot percentage value of Y with respect to the density value DKS in the graph. Then, the plotted points are interpolated by quasi-Hermitian interpolation. FIG. 11A shows examples In this figure, density at a point P is DSK (0, 4), and the dot percentage in this case is LY4 from FIG. 9A.

In the column K0 of the measured density matrix of FIG. 10, dot percentage of K is zero. Accordingly, this is a density for the case where only three colors Y, M and C are overlapped. From the graph of FIG. 11A, it is evident which value can be selected for the dot percentage of Y when outputting at a certain density, and this is the table obtained in TDPY37. Accordingly, the control unit 9 prepares the graph of FIG. 11A and incorporates said table in TDPY37.

The control unit 9 performs the same procedure for C and M and writes the obtained tables in TDPC35 and TDPM36.

Figure 11B:
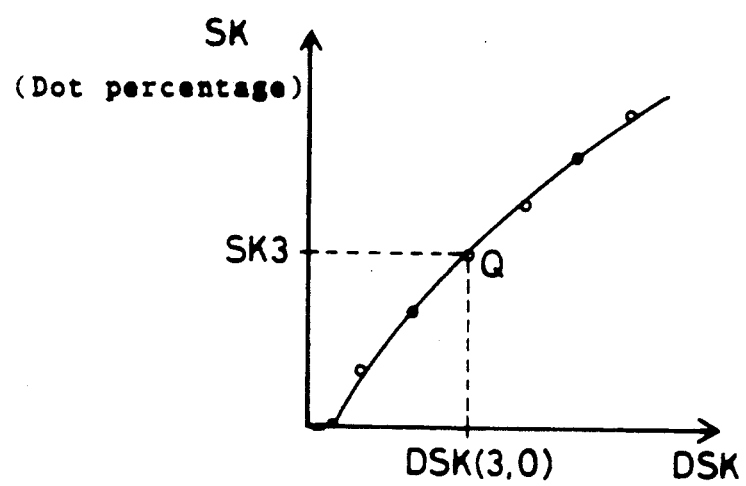

Next, the control unit 9 incorporates the density in the row 0 in FIG. 10 and plots the value of dot percentage of K with respect to the density value DSK. Then, the plotted points are interpolated by quasi-Hermitian interpolation to prepare a graph. An example is given in FIG. 11B. In this figure, the density of a point given by Q is DSK (3, 0), and the dot percentage in this case is SK3 as obtained from FIG. 9D. In the row 0, all of the dot percentages for Y, M and C are zero. Thus, this indicates the relationship between density and dot percentage for K only, and is a table obtained in TDPK38. Therefore, the control unit 9 prepares the graph of FIG. 11B and incorporates said table in TDPK38.

As the result of the above processing, it is possible to convert the density of Y, M, C and K to dot percentage. In a conversion table from dot percentage to QL, a dot percentage value is obtained in advance, which is reproduced by the QL value sent to the output unit 7 and an inverse conversion table is registered.

Figure 12:
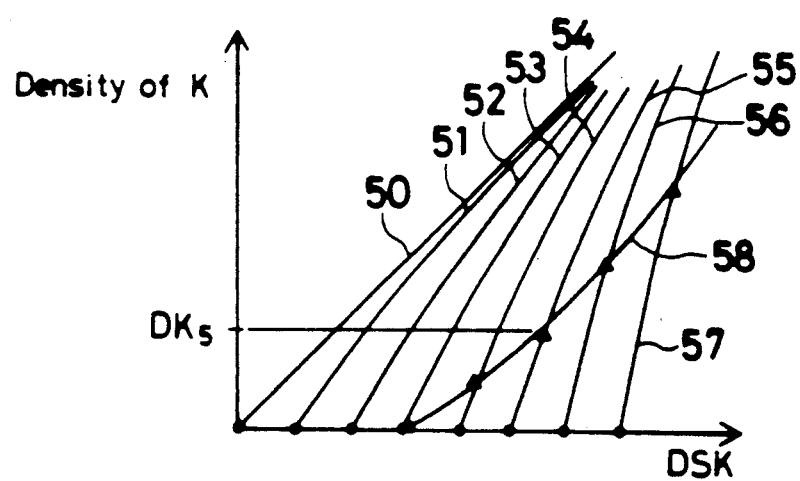
FIG. 12 is a diagram for explaining preparation and processing of a table to determine the K plate substitution value.

Next, the control unit 9 prepares a table to obtain K plate substitution values to be set in BSCALE1 by the following processing:

First, the control unit 9 plots the relationship between the measured density value and density value of K for each row of the matrix in FIG. 10. By interpolating the plotted points using quasi-Hermitian interpolation, 8 graphs given by 50 to 57 in FIG. 12 are obtained. Then, from the function $y=f_K(x)$ obtained from the combination $(x_i, y_i)=(GBALC_i, GBALK_i)$ through interpolation, the dot percentage value of K for 10 points is converted to the dot percentage value $LK_i$ of 8 steps by the following equation:

$$LK_i = 32 \times f_K(LC_i) + 448 \qquad (6)$$

$$(i = 0 \text{ to } 7)$$

In this case, if 0% continues to be in the lower level of $GBALK_i$, only the sample points higher than the highest 0% value are used. In the example of FIG. 6B, the points of HL and 1 are not used. Further, referring to TDPK38, a density value $DK_i$ to give a dot percentage value $LK_i$ is obtained.

The points to give K plate density value $DK_i$ are given on curves 50 to 57, and a curve 58 to connect the points is obtained.

In the graph thus obtained, the conditions of K plate inputted with the first gray balance is reflected, and this graph becomes a table to give the K plate substitution value. This is set to BSCALE1 by the control unit 9.

For BSCALE2, in case the K plate to be reproduced on film defines the UCR amount, the same table as BSCALE1 is set. In case the K plate to be reproduced and UCR amount must be independent, any function may be set to BSCALE2.

Figure 13A:
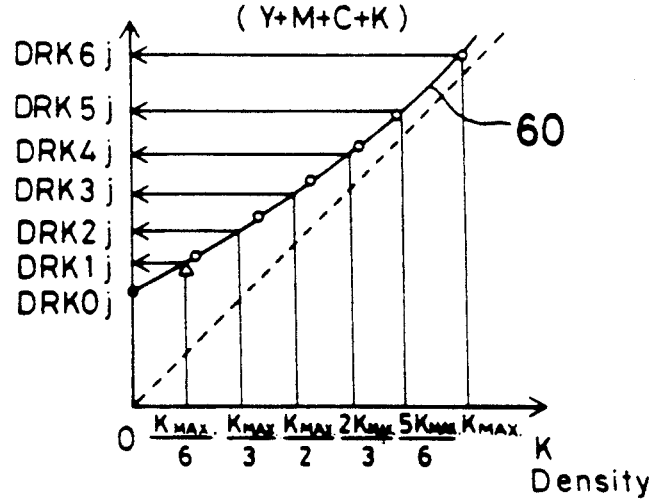
FIG. 13A-13C explains preparation and processing of a table to determine a UCR value.

Next, the control unit 9 prepares a table to set to SUBT1 and SUBT2. First, the control unit 9 prepares a curve by connecting points, which plot the relationship between the measured density value, i.e. the density value when 4 colors are overlapped, and the density of K. On this curve, 4-color overlapping density $DRK_{ij}$ corresponding to a value, which is obtained by accurately dividing the dot percentage of K from 0 to the maximum $K_{MAX}$ in 6 equal parts. This is shown in FIG. 13A. In FIG. 13A, the numeral 60 designates a graph of the plotted points in a certain row of FIG. 10 by quasi-Hermitian interpolation, and the marking "o" indicates points with respect to the dot percentage set by the test pattern for K plate in FIG. 9D. As described above, in the tables set in SUBT1 and SUBT2, the density of K must be arranged with equal spacing. In contrast, the dot percentages set by the test pattern for K plate are set by the spacing of approximately 1/6 to the density value of K100%, but it is not exactly 1/6. Accordingly, by this processing, 4-color overlapping density is obtained when the density of K is 0, $K_{MAX}/6$, $2K_{MAX}/6$, $3K_{MAX}/6$, $4K_{MAX}/6$, $5K_{MAX}/6$ and $K_{MAX}$.

By this processing, the matrix of FIG. 10 is converted to a matrix, which gives 4-color overlapping the density when density of K is divided into 6 equal parts. Next, for each column (i=0 to 6) of the converted matrix, the relationship between $DRK_{ij}$ and $DRK_{0j}$ is plotted (j=0 to 7) and interpolation is performed by quasi-Hermitian interpolation. As the result, 7 graphs are obtained as given in FIG. 13B, showing the relationship between 4-color overlapping density to each K density (i=0 to 6) accurately divided into 6 equal parts and the 3-color overlapping density when only 3 colors Y, M and C are overlapped.

Figure 13B:
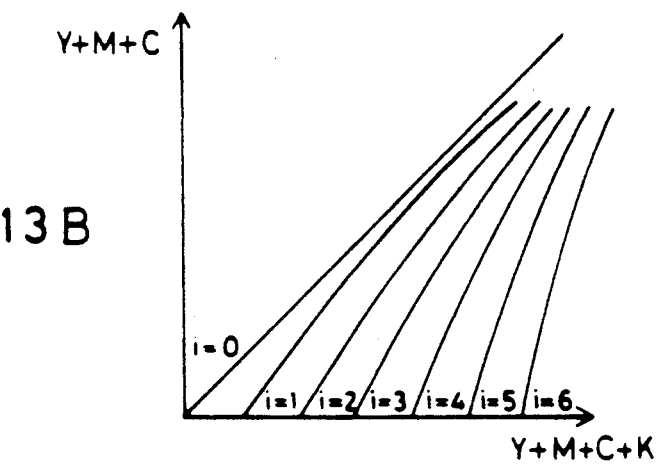
Figure 13C:
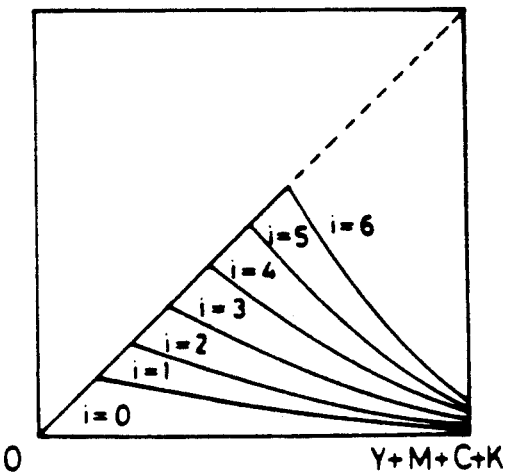

Next, the control unit 9 subtracts the value on the ordinate from the value on the abscissa for the points on each graph in FIG. 13B, and the values are plotted in relation to the abscissa. As the result, a graph of FIG. 13C is obtained. As is evident from the equation (1), this is a graph showing g $(d_4, d_K)$, i.e. the UCR amount. Therefore, the control unit 9 sets the graphs of FIG. 13C to SUBT1 and SUBT2 as tables.

As described above, tables corresponding to the inputted gray balance are written in each LUT the BSCALE1, SUBT1, SUBT2, TDPC35, TDPM36, TDPY37 and TDPK38 respectively, and the processing by the control unit 9 is completed.

Thereafter, if an "end" menu is selected on the screen of FIG. 8, the screen is turned to the screen of FIG. 6B. If a "registration" menu is selected, the table prepared is registered. If the "end" menu is then selected, the control unit 9 terminate the processing of the printing condition utility.

In the above, description has been given of an embodiment of the present invention, whereas it will be apparent to those skilled in art that many changes and modifications can be made without departing from the spirit or scope of the invention as set forth herein.

For example, the size of the matrix prepared by the test pattern for 3/4 conversion is set to 8×7 in the above embodiment, but the other sizes may be used. For the dot percentage values of Y, M, C and K to be used in the test pattern for 3/4 conversion, the dot percentage value inputted in the screen of FIG. 6B can be used in relation to the matrix size. If interpolation is needed, interpolation other than quasi-Hermitian interpolation may be applied.

As it is apparent from the above description, it is possible according to the present invention to obtain a UCR amount satisfying the desired printing conditions a simple operation and within short time because the dot percentage can be inputted to attain gray balance as desired for Y, M, C and K respectively and the outputted test pattern can be printed to input the measured density value.

What is claimed is:

1. A method for determining amount of UCR (under color removal), characterized in that:
   gray balance is set at a predetermined step;
   test patterns in the form of a matrix are printed according to said set gray balance;
   density of said test patterns in the form of a matrix is measured; and
   the UCR amount is determined according to said measured density.

2. A method for determining amount of UCR according to claim 1, wherein said gray balance setting comprises at least a highlight point.

3. A method for determining amount of UCR according to claim 1, wherein said gray balance setting comprises at least a shadow point.

4. A method for determining amount of UCR according to claim 1, wherein said test pattern comprises at least a pattern where dot percentages of yellow, magenta and cyan are all 0.

5. A method for determining amount of UCR according to claim 1, wherein said test pattern comprises at least a pattern where dot percentage of black is 0.

6. A method for determining amount of UCR according to claim 1, wherein said test pattern comprises at least a pattern where dot percentage of black is 100.

7. A method for determining amount of UCR according to claim 1, wherein said determined UCR amount is set as a table in an image processing apparatus.

8. An image processing apparatus, comprising input means, output means and control means, said output means outputting a test pattern according to a gray balance set by said input means, and said control means determining the UCR amount based on measured density of a matrix, said matrix being obtained by printing said test pattern.

9. An image processing apparatus according to claim 8, wherein said gray balance setting comprises at least a highlight point.

10. An image processing apparatus according to claim 8, wherein said gray balance setting comprises at least a shadow point.

11. An image processing apparatus according to claim 8, wherein said test pattern comprises at least a pattern where dot percentages of yellow, magenta and cyan are 0.

12. An image processing apparatus according to claim 8, wherein said test pattern comprises at least a pattern where dot percentage of black is 0.

13. An image processing apparatus according to claim 8, wherein said test pattern comprises at least a pattern where dot percentage of black is 100.

14. An image processing apparatus according to claim 8, wherein said determined UCR amount is set as a table in an image processing apparatus.

* * * * *